PROGRAMMABLE SEQUENCE DETECTOR

Filed June 17, 1963

INVENTOR.
WILLIAM K. ENGLISH
BY Samuel Lindenberg
ATTORNEY

United States Patent Office 3,243,775

Patented Mar. 29, 1966

3,243,775

PROGRAMMABLE SEQUENCE DETECTOR

William K. English, 299 Stanford Ave., Menlo Park, Calif.

Filed June 17, 1963, Ser. No. 288,314
7 Claims. (Cl. 340—146.2)

This invention relates to magnetic circuit arrangements for detecting a predetermined signal sequence, and more particularly to improvements therein.

An object of this invention is to provide a magnetic core sequence detector which is easily alterable to detect any desired sequence.

Another object of this invention is to provide an improved and simplified sequence detector circuit.

Yet another object of this invention is to provide a novel, programmable sequence detector.

These and other objects of this invention may be achieved in an arrangement wherein the sequence detector comprises a first and a second shift register. The sequence to be detected is entered into the magnetic cores, constituting the stages of the first shift register. The second shift register serves as a detector for the sequence. A toroidal core is provided for each binary digit in the sequence to be detected. An information winding is coupled to all of these toroidal cores and successively applies thereto signals which drive these cores to represent the binary digits in the unknown sequence. After each excitation of the information winding, a readout signal is applied to the cores in the first shift register and to the toroidal cores. A transfer winding applies the outputs of the cores from which readout occurs to a corresponding core in the second shift register. If these outputs are identical, then the remanent state of the corresponding core in the second shift register is unaffected. If these readout signals are not identical, then with the core in the second shift register it will be set to its one remanent state.

Before beginning a detecting sequence the even cores in the second shift register are transferred to their One representative states. Readout of the storage cores of the first shift register occurs nondestructively and in coincidence with a shifting of the second shift register. If the most recently received information pulse agrees with the state of a first register storage core, a Zero is transferred to the corresponding core of the second register. Wherever there is no agreement between the information pulse and the stored data a One is transferred to the second shift register core. Since there is no input (i.e. a Zero is transferred) to the first core of the second register, other than from the storage circuit, upon shifting a Zero will be propagated down the second register, arriving at the last core only after the last $n$ digits of information received agree with the $n$ digits stored in the first register.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figures 1, 2:
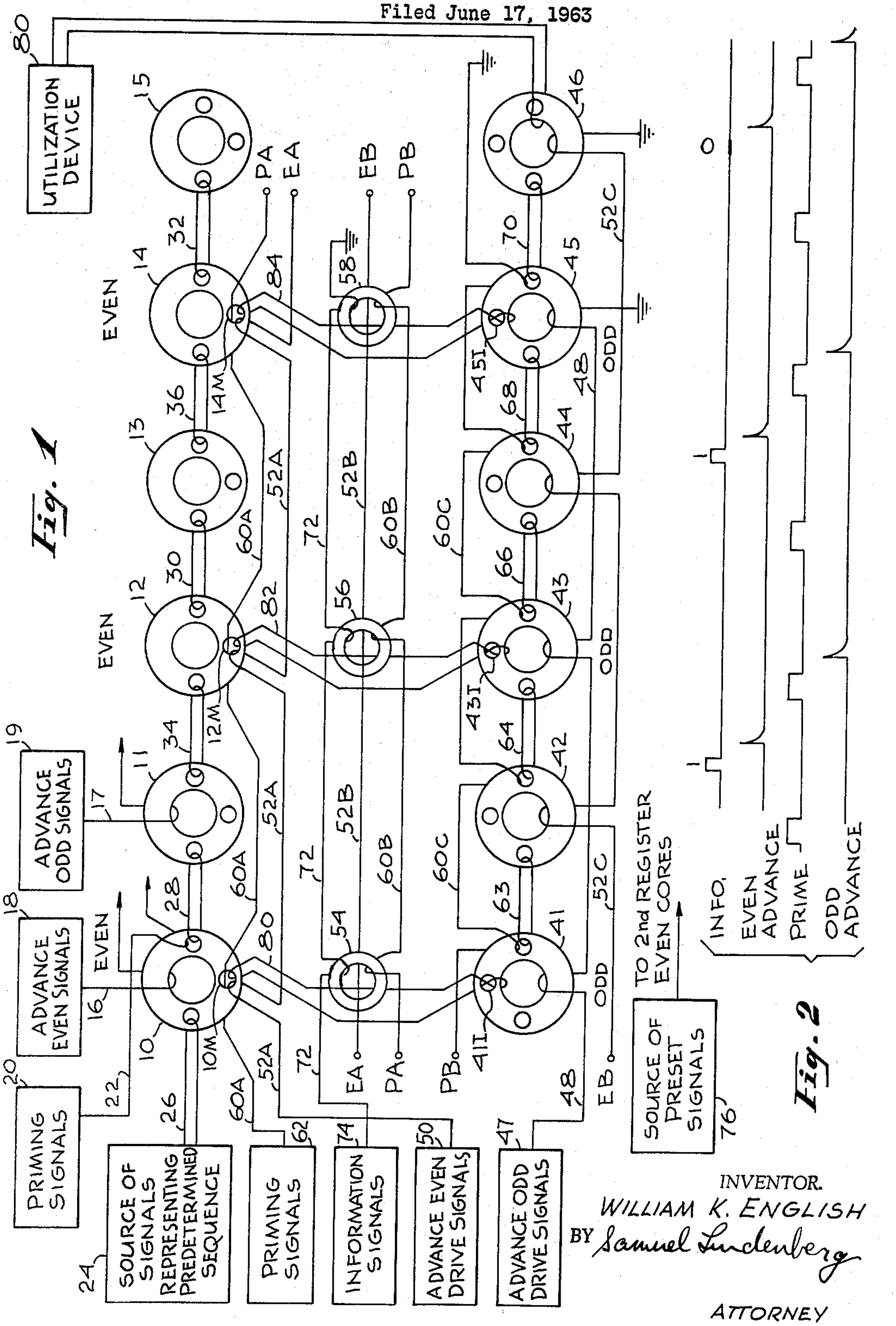
FIGURE 1 is a circuit diagram representing an embodiment of the invention.
FIGURE 2 is a timing diagram shown for the purpose of assisting in an understanding of the invention.

In FIGURE 1 there is shown a circuit diagram of an embodiment of the invention for detecting three binary bits in a predetermined sequence. This is shown by way of illustration, and not by way of limitation, since those skilled in the art will have no difficulty in extending the circuit shown in FIGURE 1 to include an arrangement for detecting any desired number of binary digits in a sequence.

The embodiment of the invention includes two shift registers, each of which uses multiaperture cores and each of which has as many stages as there are binary bits desired to be detected. In addition, the embodiment of the invention uses a toroidal core for each binary bit desired to be detected. As shown in FIGURE 1, the first of these shift registers includes six multiaperture cores, respectively 10, 11, 12, 13, 14, and 15. These comprise a three stage shift register, there being two cores per stage. Cores 10, 12 and 14 are regarded as the even cores of the shift register hereafter, with cores 11, 13 and 15 being regarded as the odd cores of the shift register. This first shift register is of the type well known in the art having the usual advance even winding 16, which is inductively coupled to all of the even numbered cores passing through their main apertures, and an advance odd winding 17, inductively coupled to all of the odd numbered cores and passing through their main apertures. In order to preserve clarity in the drawings, only a fragmentary portion of the even and odd windings respectively 16 and 17 are shown. The respective even and odd windings, when used, are driven from an advance even signal source 18, and an advance odd signal source 19, respectively.

Priming signals are applied from a source 20 to a winding 22, which passes through the output minor apertures of each one of the multiaperture cores 10 through 15 of the first shift register. The priming winding 22 is shown passing through only the output minor aperture of the first core 10 in order to preserve clarity in the drawings.

The digits of the predetermined binary sequence which it is desired to detect, are entered into the shift register, in the usual manner, by being applied serially from a source of signals representing the predetermined sequence 24, to the first core of the shift register and thereafter being transferred by alternate operation of the odd and even advance windings, until the shift register is filled. The output of the source of signals 24, is therefore applied to an input winding 26. This transfers the core 10 to a state of magnetic remanence which will represent either a One or a Zero binary digit being stored therein. The priming signal source 20 then primes the magnetic material around the output aperture of the core 10. Thereafter, the advance even winding 16 is energized whereby all the even cores are returned to their clear states of magnetic remanence. The state of magnetic remanence of all of the even cores in the register are then transferred to the odd cores in the register by means of transfer windings respectively 28, 30, 32, each of which couples the output minor aperture of a preceding even core to the input minor aperture of a succeeding odd core. A priming pulse is then applied to the odd cores. The advance odd signal source energizes the advance odd winding 17, whereby all of the odd cores are restored to their clear states. This results in a transfer of the state of magnetic remanence of each odd core to the succeeding even core, using the transfer windings respectively 34, 36, which couple the output minor aperture of a preceding odd core to the input minor aperture of a succeeding even core.

The second shift register has identical windings as the first shift register. It too, comprises three stages having two cores per stage respectively 41, 42, 43, 44, 45, 46. The odd cores in this shift register however, respectively 41, 43, and 45, are the first, third and fifth cores here. An advance odd drive current source 47, applies current to a winding 48, which is inductively coupled to the odd cores 41, 43, and 45, and passes through their main apertures. An advance even drive source 50, applies drive current to the advance even winding. The advance even winding has three sections, respectively 52A, 52B, and 52C. These three sections are connected in series with each other. The section 52A passes through second output minor apertures respectively 10M, 12M and 14M of first shift register. The end, designated as EA of the winding section 52A, then connects to the end, designated as EA of the winding section 52B. This section passes through the three toroidal cores respectively 54, 56, and 58. The other end of the advance even winding, designated as EB is connected to the end EB of the section 52C. The section 52C passes through the main apertures of cores 42, 44 and 46.

A priming signal source 62, drives a priming winding which has three sections respectively 60A, 60B, and 60C. These three sections are connected in series. The first section 60A is inductively coupled to the even cores 10, 12 and 14 of the first shift register, passing through their respective second minor output apertures 10M, 12M, 14M, and terminating at a terminal designated as PA. The terminal PA is connected to the corresponding terminal PA of the second section 60B, of the priming winding. The second section passes through the toroidal cores 54, 56, and 58 ending in the terminal PB. The terminal PB of the section 60B of the priming winding connects with terminal PB of the end of the priming winding section 60C. This priming winding section 60C passes through all the output apertures of all of the cores in the second shift register, in the usual fashion. The second shift register cores also have transfer windings respectively 63, 64, 66, 68 and 70 which couple the output minor aperture of a preceding core to the input minor aperture of a succeeding core, whereby the states of magnetic remanence of these cores may be successively transferred through the register.

An information winding 72 is inductively coupled to all of the toroidal cores 54, 56, 58, for the purpose of successively driving them to represent binary signals in a sequence which it is desired to inspect for the presence of the predetermined sequence. The information winding 72 is driven from a source of information signals 74.

Before the commencement of a detecting operation the even magnetic cores 42, 44, 46, in the second shift register are transferred to their binary One representing states of magnetic remanence. Any of the well known methods may be employed for presetting the second shift register in this manner. For example, the presetting operation may be achieved by entering a series of One's into the first stage of the shift register while shifting the register until it assumes the desired pattern. Another way of doing this is to use a preset signal source 76, which drives a winding 78, which is inductively coupled to all of the even cores of the second shift register with a winding sense such that when this winding is energized it causes these even cores to assume the desired states of magnetic remanence.

Each one of the even cores, respectively 10, 12, 14, and each one of the toroidal cores respectively 54, 56, 58, have their outputs combined and applied to each one of the associated odd cores respectively 41, 43, 45, in the second shift register. This function is performed by transfer or detecting windings 80, 82, 84. Each one of these windings passes through the second output minor aperture of the even numbered cores in the first shift register, then passing through the toroidal cores 54, 56, 58, respectively, and then coupling to the inner and outer legs of a second input aperture of the associated odd cores by first passing through the respective through the respective input minor apertures 41I, 43I, 45I, then around through the central apertures, back through the respective input apertures and thereafter closing the respective windings.

In order to explain the operation of the embodiment of the invention, first assume that it is desired to detect the presence of the binary digit sequence 110, in a sequence of binary digits being provided as signals by the information signal source 74. The respective cores 10, 12 and 14 are driven, in well known manner, to represent the binary signals 1, 1 and 0, by their states of magnetic remanence. FIGURE 2 represents a timing diagram of the signals which are provided by the information signal source, the advance even drive signal source, the prime signal source and the advance odd signal source. It should be noted that the first shift register, after it has had the desired binary signal sequency stored therein is no longer operated as a shift register, but rather as a storage device, wherein the binary signal sequence stored therein is stored nondestructively.

Prior to the receipt of the first information signal, as shown in FIGURE 2, a priming signal occurs which primes the second output apertures of the storage cores 10, 12 and 14 of the first register by means of winding 60A, and the output apertures of the second register by means of winding 60C. Winding 60B applies priming mmf. to the toroidal cores only to hold them in their Zero representating state. If this were not done currents induced in coupling loops 80, 82, 84, due to priming of the output apertures 10M, 12M and 14M, would transfer these toroidal cores to their One state making it impossible to receive information in these cores. Following the prime signal and prior to the advance even pulse, time is allowed for the receipt of information.

Should the first signal from the information signal source 74, be a One representative signal, as shown in FIGURE 2, then all of the toroidal cores 54, 56, and 58, are driven to their One representative states of magnetic remanence. The next signal which occurs, as may be seen in FIGURE 2, is an advance even signal pulse from a source 50. This causes a readout operation from the cores of the first shift register to which the advance even winding 52A is coupled, and also a readout operation from all of the toroidal cores. The sense of the coupling of the winding 80 on these cores is such that when both cores are in the One representative state the voltages induced in the transfer winding 80, upon readout, cancel each other so that the odd core 41 is left unaffected. Should the first shift register core and the toroidal core have been storing dissimilar binary digits at the time of readout, then there would be a resultant output in the transfer winding coupling these two cores to the second shift register core, which has the effect of driving this second shift register core to a remanent state wherein it represents a One binary digit.

Since, in the present situation the first binary digit stored by the toroidal cores 54, 56 and 58, was a One, then core 41, is left unaffected in its Zero state of magnetic remanence. Since cores 42 and 44 had been preset to their One state, this state will be transferred via coupling loops 64 and 68 to cores 43 and 45. Cores 43 and 45 will therefore be transferred to their One state independent of any currents in coupling loops 82 and 84.

The next pulse, in accordance with FIGURE 2, which occurs, is that of the priming signal source 62, whereby output apertures 10M, 12M and 14M of cores 10, 12 and 14, are again primed. It should be noted at this time that the effect of the readout of the binary digits stored in the first shift register even cores, is to merely reverse the direction of the flux in the ferrite material surrounding the second output apertures 10M, 12M, 14M in those cores storing a One binary digit. The current on the priming winding 60A returns the magnetic flux to the direction it had at the time of the application of the magnetomotive drive by the advance even winding 52A. The priming winding section 60B passes through the toroidal cores 54, 56, 58, again holds these cores in their clear or binary Zero state of magnetic remanence. The third section of the priming winding 60C, primes the odd cores of the second shift register so that upon the occurrence of the odd advance pulse, the Zero state of the core 41 is transferred to the core 42, and the One states of cores 43 and 45 are transferred to cores 44 and 46.

Another priming pulse then occurs priming the output aperture of core 44. Core 42 is at this time in its Zero state so no priming occurs in this core. Following the priming pulse another information signal is received. Should this signal be a One, toroidal cores 54, 56 and 58 are set to their One state. At the following advance even pulse the stored information is read out and compared with the just received information pulse. If, as is the case here, the state of storage core 12 and toroidal core 56 agree (both One here) there will be no current in coupling loop 82. Since core 42 is a Zero there will be no current in coupling loop 64 and core 43 will not be transferred to its One state. Core 45 will however be transferred to the One state by current in loop 68, independent of the state of cores 14 and 58. In this way it may be seen that a Zero has propagated as far as core 43 after the second information pulse and the information in core 10 was compared with the first information pulse and the information in core 12 was compared with the second information pulse.

If in the present example the third information pulse received is a Zero, toroids 54, 56, and 58 will not be set to their One state prior to the advance even pulse. Core 14 however, is storing a Zero and neither toroid 58 nor core 14 will induce voltage in coupling loop 84. Coupling loop 68 carries no current since core 44 was in the Zero state and hence core 45 is left in the Zero state after the advance even pulse. Following another prime pulse the next advance odd pulse will then transfer a Zero to core 46 (core 46, which had been cleared to the Zero state by the advance even pulse, is left in this Zero state following the digit advance odd pulse). The utilization device may then indicate the successful detection of a predetermined stored sequence by detecting that core 46 is in the Zero state following an advance odd pulse.

In summary therefore, the first shift register is used for the purpose of storing the desired sequence of binary digits to be detected in an unknown binary signal sequence. The toroidal cores serve the function of temporarily storing each digit of the binary sequence undergoing detection. A readout operation occurs during which the digits stored in the first shift register are compared with the digit temporarily stored in the toroidal cores. A similarity of stored digits leaves the cores in the detecting or second shift register unaffected, (transfers a Zero). When a dissimilarity occurs, corresponding cores in the second shift register are driven to their One state. Accordingly, a successful detection operation is signified by the last core of the detecting register having a binary Zero representative state of magnetic remanence at the termination of its detecting cycle.

The toroidal cores 54, 56, 58, should have their sizes and magnetic properties selected so that upon the occurrence of a readout, the voltage induced in the respective transfer windings 80, 82, 84, should substantially equal the voltage induced in these windings from the cores 10, 12, and 14.

There has accordingly been described and shown herein a novel, useful and variable binary signal sequence detector, wherein any predetermined binary signal sequence may be entered into the first shift register, the unknown signal sequence may be applied to the toroidal cores, and the detecting function effectuated by the second shift register.

I claim:

1. A sequence detector for detecting a predetermined sequence of binary digit signals comprising a plurality of stages each stage being assigned to detect a different binary signal in said sequence, each stage including first, second and third magnetic storage means each of which has two different states of magnetic remanence respectively representative of a binary One and a binary Zero being stored therein, means for driving each first magnetic storage means to a magnetic remanent state representative of the binary signal in said sequence it is desired to detect, information winding means for successively driving said second magnetic storage means to a state of magnetic remanence representative of a binary signal in said sequence it is assigned to detect, information winding means for successively driving each said second magnetic storage means to a magnetic remanent state representative of successive binary digit signals, means for driving each said first and second magnetic storage means to a predetermined one of their states of magnetic remanence, transfer winding means coupling each said first, second and third magnetic storage means responsive to said first and second storage means being driven to their predetermined states of magnetic remanence for driving said third magnetic storage means to a predetermined state of magnetic remanence when said first and second storage means store a different binary digit at the time they are given and for leaving said third magnetic storage means unaffected when said first and second storage means store the same binary digit.

2. A sequence detector for detecting a predetermined sequence of binary digit signals comprising a plurality of stages, each stage being assigned to detect a different binary signal in said sequence, each stage including first, second and third magnetic storage means each of which has two different states of magnetic remanence respectively representative of a binary One and a binary Zero being stored therein, first means for driving each first magnetic storage means to a remanent state representative of the binary signal in said sequence it is desired to detect, means for establishing the third magnetic storage means in the first of said plurality of stages in its binary Zero state of remanence and the remaining ones of said first magnetic storage means in their One states of magnetic remanence, information winding means for successively driving all said second magnetic storage means to a state of magnetic remanence representative of successive binary digit signals, second means for driving each of said first and second magnetic storage means to a predetermined one of their states of magnetic remanence, transfer winding means inductively coupling each said first, second and third magnetic storage means responsive to said first and second storage means being driven to their predetermined states of magnetic remanence for driving said third magnetic storage means to a binary One representative state when said first and second storage means store a different binary digit at the time they are driven and for leaving said third magnetic storage means unaffected when said first and second storage means stores the same binary digit, means for restoring all said first storage means to their remanent states representative of the binary digits desired to detect after each drive by said second means for driving, and means for transferring the remanent state of each third magnetic storage means to a succeeding magnetic storage means after each drive by said second means for driving.

3. A sequence detector as recited in claim 2 wherein each said first and third magnetic storage means comprise a multiaperture core having a main aperture and at least one minor aperture, each said second magnetic storage means comprises a toroidal magnetic core having a main aperture; said transfer winding means inductively coupling said first, second and third magnetic storage means passes through the minor apertures of said multiaperture cores and through the main apertures of said toroidal core; and said information winding means comprises a winding inductively coupled to all of said toroidal magnetic cores.

4. A sequence detector for detecting a predetermined sequence of binary digits comprising a storage register having a plurality of storage stages, each storage stage being assigned to store a different binary digit of said binary digits to be detected, means for storing in each stage of said storage register the assigned binary digit, a detecting register having a detecting stage assigned to each stage of said storage register, each said detecting stage having two different stable states, means for transferring the first detecting stage of said detecting register to one of its two stable states and the second detecting stage to its other stable state, a plurality of magnetic cores, a different one of said cores being associated with each of said storage stages, each of said magnetic cores having two stable states of magnetic remanence one of which represents a binary One digit and the other of which represents a binary Zero digit, information winding means coupled to all of said magnetic cores for successively driving them to the stable states representative of a sequence of binary digits to be detected, means operable after each successive drive by said excitation winding means for simultaneously reading out of each storage stage of said storage register and out of each associated magnetic core the binary digit stored therein, a separate transfer winding means coupling each storage stage and associated magnetic core to each associated detecting stage for transferring said associated detecting stage to its other stable state when the binary digits read out are dissimilar and for leaving the associated detecting stage unaffected when they are similar, means for restoring the assigned binary digit in each storage register stage after each readout operation, and means for transferring the state of stability of each detecting stage to a succeeding stage after each operation of said means operable after each successive drive whereby a successful sequence detection is indicated by the last detecting stage being in its said one stable state at the conclusion of a detection sequence.

5. A sequence detector as recited in claim 4 wherein said storage register and said detecting register each comprises a magnetic core shift register.

6. A sequence detector for detecting a predetermined sequence of binary digits comprising a first and a second magnetic core shift register each having as many stages as there are binary digits to be detected in a desired sequence, each stage of said first shift register being assigned to store a different binary digit in said binary digits to be detected, each stage of said second shift register being associated with a different one of said first shift register stages, each stage of said first and second shift registers including a multiaperture ferrite core having a major and a minor aperture, each said core having a Zero representative and a One representative state of magnetic remanence, means for driving the core in each stage of said first shift register to a state of magnetic remanence representing the assigned binary digit to be detected, means for establishing the core in the first stage of said second shift register in its Zero representative state and the core of said second shift register stages in its One representative state, a plurality of magnetic toroidal cores, a different one of said toroidal cores being associated with each core in each stage of said first shift register, each of said magnetic cores having a Zero and a One representative state of magnetic remanance, an information winding inductively coupled to all said toroidal cores, means for successively energizing said information winding with binary signals representative of a sequence desired to be detected, readout winding means for driving each core in said first register and each toroidal core to readout the binary digits stored therein, priming winding means coupled to all said cores in said first register for restoring the binary digit read out by said readout winding means, a separate transfer winding means coupling each said core in said first shift register and each assigned toroidal core to each core in an associated stage in said second shift register for transferring said associated core to a One representative remanent state when the binary digits read out are dissimilar and for leaving the said core in each associated stage unaffected when the binary digits read out are similar, and means for successively transferring after each operation of said readout winding, the remanent states of said cores in said stages of said shift register to cores in successive stages of said shift register whereby a successful sequence detection is manifested by the core in the last shift register being in its Zero representative state of remanence.

7. A sequence detector as recited in claim 6 wherein each said transfer winding means comprises a winding passing through the minor aperture of the core in the first shift register, then through the aperture of the associated toroidal core, then through the minor aperture of the associated core of said second shift register, through the major aperture of said core, and back through the minor aperture of said core.

References Cited by the Examiner

UNITED STATES PATENTS

| | | | |
|---|---|---|---|
| 3,139,606 | 6/1964 | Hathaway | 340—146.2 |
| 3,159,813 | 12/1964 | Dowling | 340—146.2 |

MALCOLM A. MORRISON, *Primary Examiner.*

M. J. SPIVAK, *Assistant Examiner.*